United States Patent [19]
Straub et al.

[11] Patent Number: 6,134,577
[45] Date of Patent: Oct. 17, 2000

[54] METHOD AND APPARATUS FOR ENABLING ADDRESS LINES TO ACCESS THE HIGH MEMORY AREA

[75] Inventors: Eric Straub, Kirkland; Mike Dryfoos, Bothell, both of Wash.

[73] Assignee: Microsoft Corporation, Redmond, Wash.

[21] Appl. No.: 08/505,805

[22] Filed: Jul. 21, 1995

Related U.S. Application Data

[63] Continuation of application No. 08/384,551, Jan. 25, 1995, abandoned, which is a continuation of application No. 07/847,524, Mar. 6, 1992, abandoned.

[51] Int. Cl.[7] ........................................................ G06F 9/00
[52] U.S. Cl. .......................................................... 709/100
[58] Field of Search .................................... 395/700, 425, 395/400; 709/100, 101, 102, 103, 104, 273; 712/229; 713/100

[56] References Cited

U.S. PATENT DOCUMENTS

| | | | |
|---|---|---|---|
| 4,779,187 | 10/1988 | Letwin .................................... | 395/725 |
| 5,083,259 | 1/1992 | Maresh et al. ..................... | 364/DIG. 1 |
| 5,123,098 | 6/1992 | Gunning et al. ......................... | 395/400 |
| 5,237,669 | 8/1993 | Spear et al. .............................. | 395/400 |

OTHER PUBLICATIONS

Derfler et al, Lan memory management, PC magazine Jan. 29, 1991 v10 n2 p203 (16).

Gunther, Get maximum memory from your 386, Data Based advisor May 1990 v8 n5 p. 87(4).

Duncan, Power programming PC magazine Jun., 27, 1989 v8 n12 p. 321(6).

Prosise, Understanding HIMEM.SYS, PC Magazine Dec. 11, 1990 v9 n21 p. 547(2).

Thielen, David, "Less Filling, Tastes Great: A Programmer's Survey of MS–DOS Version 5," *Microsoft Systems Journal*, 6(4): Jul. 17–26, 1991.

*Primary Examiner*—Majid A. Banankhah
*Attorney, Agent, or Firm*—Joseph R. Kelley; Westman, Champlin & Kelly, P.A.

[57] ABSTRACT

A method for interfacing an application program with an operating system of a computer when the application program relies on a predetermined address line to be set in a low state during the initial stages of the application program's operation. The computer has a lower memory region, which is addressable when the predetermined address line is in a low state, and an upper memory region, which is addressable when the predetermined address line is in a high state. The method provides an operating system stub in the lower memory region of the computer and provides an operating system in the higher memory region of the computer. The stub receives each operating system call made by the application program. After receiving an operating system call, the operating system stub sets the predetermined address line to the high state if the predetermined address line is in the low state then invokes the operating system call. Upon return from the operating system call, the stub determines whether the application program has made more than a predetermined number of operating system calls. If the application program has not made more than a predetermined number of operating system calls, the stub resets the predetermined address line to the low state.

17 Claims, 2 Drawing Sheets

METHOD AND APPARATUS FOR ENABLING ADDRESS LINES TO ACCESS THE HIGH MEMORY AREA

CROSS-REFERENCE TO RELATED APPLICATION

This application is a continuation of U.S. patent application Ser. No. 08/384,551, filed Jan. 25, 1995, now abandoned, which is a continuation of U.S. patent application Ser. No. 07/847,524, filed Mar. 6, 1992, now abandoned.

TECHNICAL FIELD

The present invention is directed toward a method for interfacing an operating system of a computer with an application program and, more particularly, a method for interfacing an application program with an operating system of a computer wherein the operating system of the computer is stored in the high memory area of the computer's memory.

BACKGROUND OF THE INVENTION

Most personal computers include an operating system for interfacing application programs with the computer. Personal computers also include a microprocessor that has a number of address lines sufficient for addressing the memory of the computer, referred to as the computer memory. The address lines define an address space of the personal computer's memory wherein the address space has an upper region and a lower region.

Typically, the operating system of a personal computer is stored in the lowest available region of the computer's address space. For this reason, certain ones of the computer's address lines are usually set to a logical zero when the operating system is being accessed. Particularly, address line 20 is normally set to logical zero when an operating system stored in the lowest available region of a personal computer's address space is being accessed. Conversely, when the operating system is stored in the upper region of the computer's address space, i.e., high memory area, address line 20 must be set to a logical one when the operating system is being accessed.

Herein, the term upper region and lower region are used to distinguish those portions of the computer's memory that are addressable with address line 20 enabled and disabled, respectively. Generally, the lower region of the computer's memory is always accessible and the upper region of the computer's memory can be made accessible under program control.

Some application programs rely upon address line 20 being set to zero during their initial stages of execution. However, if the operating system is stored in the upper region of the computer's address space, address line 20 must be set to a logical one so that the operating system can be accessed. For this reason, application programs that rely upon address line 20 being set to a logical zero when they are being executed may not operate properly when the operating system is stored in the upper region of the computer's address space. Accordingly, it is desirable to provide a method for loading application programs from a fixed storage medium into a computer's memory when the operating system of the computer is stored in the upper region of the computer's address space.

Further, after the application program has been loaded into the memory of the computer and the computer is executing the program, all calls to the operating system must be made with address line 20 set to a logical one. However, since some application programs will not operate properly if address line 20 is set to a logical one during their initial stages of execution, it is necessary to have address line 20 set to a logical zero for at least this period of time. Further, changing the state of address line 20 while an application program is executing is time consuming, increasing the overall time necessary for the application. For this reason, it is desirable to leave address line 20 set to a logical one, to enable proper access to the operating system, as much as possible. Accordingly, it is desirable to provide a method for loading application programs from a fixed storage medium into a computer's memory when the operating system of the computer is stored in the upper region of the computer's address space, which method also is capable of leaving address line 20 set for as much time as possible while an application program is being executed.

SUMMARY OF THE INVENTION

The present invention is a method for interfacing an application program with an operating system of a computer. The computer includes a plurality of address lines for accessing an address space of the computer wherein the plurality of address lines define an upper region of the computer's address space and a lower region of the computer's address space. A predetermined address line of the computer must be in a first state to access the upper region of the address space. The method includes the steps of storing the operating system of the computer in the upper region of the computer's address space. The method also includes the step of determining whether the predetermined address line is in the first state prior to each call to the operating system and, if not, placing the predetermined address line in the first state. The method further includes the step of determining whether more than a predetermined number of calls have been made to the operating system while the application program is being executed and, if so, leaving the predetermined address line in the first state after each subsequent call to the operating system is completed and, if not, returning the predetermined address line to the second state after the call to the operating system is completed.

DETAILED DESCRIPTION OF THE INVENTION

Figure 1:
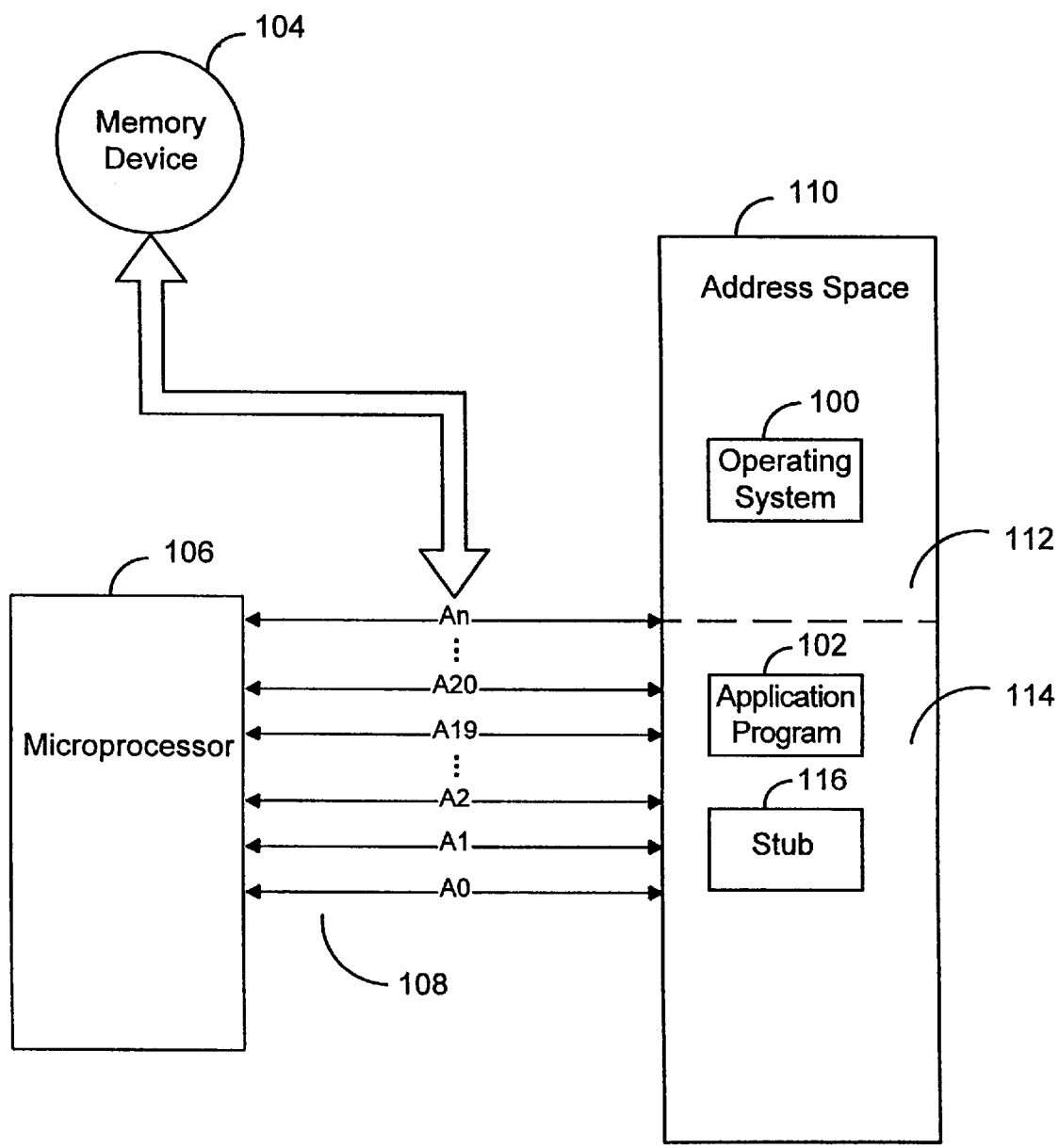
FIG. 1 illustrates a personal computer practicing the method that is the subject of the present invention.

The present invention is a method for interfacing application programs with a personal computer. FIG. 1 illustrates a personal computer practicing the method that is the subject of the present invention. As is known in the art, personal computers typically include an operating system 100 for interfacing application programs 102 with the personal computer. Also, personal computers usually include memory devices 104 for storing the operating system and for storing application programs that are being executed by the personal computer. The personal computer further includes a microprocessor 106, or other data processing device, having a number of address lines 108 sufficient for accessing the address space 110 of the personal computer. The address lines of the microprocessor define an upper region 112 of the personal computer's address space and a lower region 114 of the personal computer's address space.

As discussed above, the terms upper region 112 and lower region 114 are used herein to distinguish those portions of the computer's memory that are addressable with a predetermined address line enabled and disabled, respectively. Generally, the lower region 114 of the computer's memory is always accessible and the upper region of the computer's memory can be made accessible under program control.

In a presently preferred embodiment of the invention, the operating system 100 of the personal computer is stored in the upper region 112 of the personal computer's address space 110. As such, predetermined ones of the microprocessor's address lines 108 must be in a predetermined state to access the operating system 100. Particularly, address line 20, sometimes referred to as A20 (see FIG. 1), must be set to a logical one to access the upper region 112 of the address space 110 of the personal computer.

However, some application programs do not operate properly if address line 20 is set to a logical one during certain times. As an example, some application programs 102 will not execute properly if address line 20 is set to a logical one during their initial stages of execution. Accordingly, it is desirable to have address line 20 set to a logical one when the operating system 100 of the subject personal computer is being accessed and to have address line 20 set to a logical zero at times necessary for proper operation of the application program 102.

To accomplish the switching of address line 20, the subject personal computer stores a stub 116, or portion of the operating system, in the lower region of the computer's address space 110. All calls to the operating system 100 from the application program 102 are directed to the stub 116, which in turn directs the call the operating system 100. Further, after the operating system 100 has completed the call, it returns control of the computer to the stub 116 before control is passed back to the application program 102.

Figure 2:
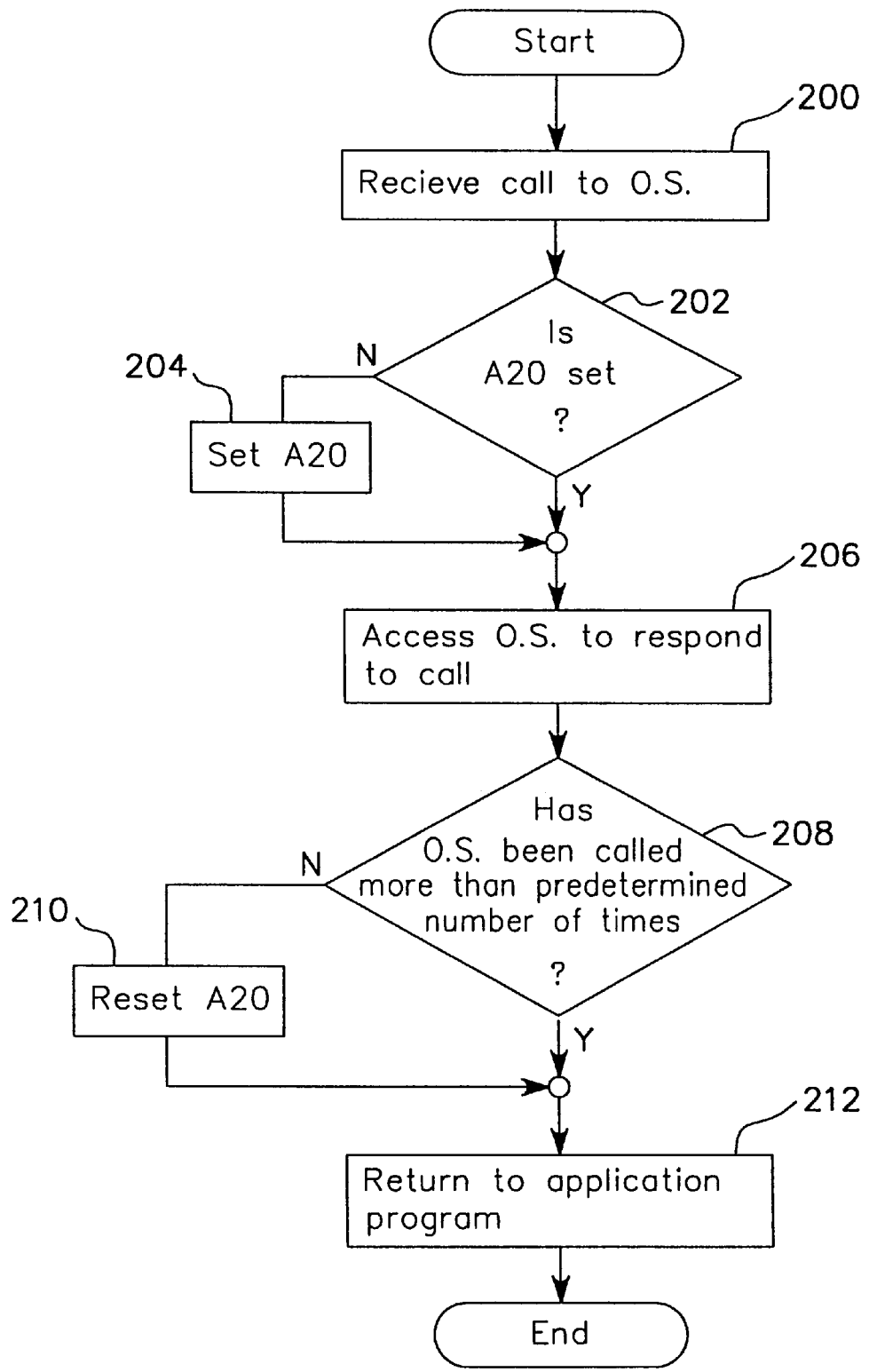
FIG. 2 is a decision flow diagram illustrating the method that is the subject of the present invention.

An example of the manner in which the operating system of the computer, the stub, and the application program interact, in accordance with the subject invention, is illustrated in the decision flow diagram of FIG. 2. Therein, calls to the operating system from the application program are received by the stub, step 200. The stub determines whether address line 20 is set, step 202, and, if not, sets address line 20, step 204, prior to forwarding the call to the operating system, step 206. In this manner, the stub insures that address line 20 is set prior to each access of the operating system.

Those skilled in the art will appreciate that the processing of setting and resetting address line 20, described above, is time consuming, increasing the overall time required to complete the application. To minimize the time burden of switching address line 20, while insuring that address line 20 is set at times necessary for proper operation of the application program, the stub also determines when it is safe to leave address line 20 set without danger that the application program will malfunction. In a presently preferred embodiment of the invention, this decision is made by the stub after the call to the operating system is complete, step 206.

When the call is complete, the stub determines whether the operating system has been called more than a predetermined number of times, step 208, and, if not, resets address line 20, step 210, before returning control of the computer to the application program, step 212. However, if the operating system has been called more than the predetermined number of times, then the stub leaves address line 20 set and returns to the application program.

The above method for determining when it is safe to leave address line 20 set is both effective and efficiently implemented. However, those skilled in the art will appreciate that other methods for determining when it is safe to leave address line 20 set may be substituted therefor without departing from the true scope and spirit of the present invention. Further, the number of system calls to be made before the predetermined address line is left set may be variable from program to program and from operating system to operating system. This information can be associated with the program in the manner described in U.S. patent application Ser. No. 07/847,525, entitled *Method For Storing Programs,* by Eric Straub et al., filed Mar. 6, 1992 (concurrently herewith), the disclosure of which is incorporated herein by the foregoing reference thereto.

Also, it will be apparent to those skilled in the art that although the invention has been described herein by reference to a single address line, several address lines could be toggled in the manner discussed above.

It will be apparent to those skilled in the art that although only several presently preferred embodiments of the invention have been described in detail herein, many modifications and variations may be provided without departing from the true scope and spirit of the invention. Accordingly, the invention is not limited except as by the appended claims. Also, those skilled in the art will appreciate that the enabling and disabling of the address line could be performed by the application program instead of the stub.

What is claimed is:

1. A method for interfacing an application program with an operating system of a computer, the computer including an address space having an upper region and a lower region, the computer also including a plurality of address lines for accessing the address space wherein each of the plurality of address lines has a first and a second state and wherein a predetermined address line must be in the first state to access a portion of the operating system, the method comprising the computer-implemented steps of:

(a) storing the portion of the operating system in the upper region of the address space;

(b) storing an operating system stub in the lower region of the address space;

(c) directing calls to the operating system by the application program to the operating system stub; and (d) for each of the calls directed to the operating system stub, (d1) determining whether the predetermined address line is in the first state and, if not, placing the predetermined address line in the first state, (d2) after the predetermined address line is in the first state, forwarding the call to the stored portion of the operating system in the upper region, (d3) after completion of each call to the portion of the operating system, returning to the operating system stub, and (d4) after returning to the operating system stub, determining whether more than a predetermined number of calls have been made to the operating system by the application program and, if so, leaving the predetermined address line in the first state and, if not, placing the predetermined address line in the second state.

2. A method for interfacing an application program with an operating system of a computer, the computer having a lower memory region which is addressable when a predetermined address line is in a disabled state and having an upper memory region which is addressable when the predetermined address line is in an enabled state, and wherein the application program relies on the predetermined address line to be set in the disabled state during initial stages of operation of the application program, the method comprising the computer-implemented steps of:

storing an operating system stub in the lower memory region;

storing a portion of the operating system in the upper memory region; and for each of a plurality of operating system calls made by the application program, receiving the operating system call in the operating system stub;

redirecting the received operating system call to the operating system by ensuring that the predetermined address line is in the enabled state;

performing the operating system call by accessing the portion of the operating system in the upper memory region;

returning to the operating system stub after performing the operating system call;

under control of the operating system stub, determining whether the application program is in its initial stages of operation;

when the application program is in its initial stages of operation, setting the predetermined address line to the disabled state; and returning to the application program from the operating system stub.

3. The method of claim 2 wherein the step of redirecting the received operating system call to the operating system is performed by the operating system stub and comprises the computer-implemented step of:

setting the predetermined address line to the enabled state if the predetermined address line is in the disabled state.

4. The method of claim 3 wherein the step of determining whether the application program is in the initial stages of operation comprises the computer-implemented step of:

determining whether the application program has made less than a predetermined number of calls to the operating system.

5. A method in a computer system for invoking an operating system function of an operating system by an application program, the computer system having a lower memory and an upper memory, the upper memory being accessible by setting the address line to a first state, the operating system function being stored in upper memory, the application program expecting the address line to be in a second state, the method comprising the computer-implemented steps of:

storing an operating system stub in the lower memory;

directing invocations of the operating system function by the application program to the operating system stub; and under control of the operating system stub, ensuring that the address line is in the first state, invoking the operating system function, and upon completion of the operating system function, setting the address line to the second state when the application program has made less than a predetermined number of calls to the operating system during its initial stages of execution.

6. An apparatus in a computer system for ensuring proper operation of a computer program, the program having an initial operation stage, the apparatus comprising:

a predetermined address line having an enabled state and a disabled state;

a memory having an upper memory region and a lower memory region, the upper memory region being addressable only when the predetermined address line is in the enabled state;

an operating system component stored in the upper memory region; and an operating system stub stored in the lower memory region, the operating system stub receiving an operating system call from the program and ensuring that the predetermined address line is in the enabled state before directing the received operating system call to the operating system component, the operating system stub further determining whether the program is in the initial operation stage, and, before returning to the program, placing the predetermined address line into the disabled state when the program is in the initial operation stage.

7. The apparatus of claim 6 wherein the operating system stub determines whether the program is in the initial operation stage by determining whether less than a predetermined number of calls have been made to the operating system component from the program.

8. In a computer system, an apparatus for ensuring the proper functioning of a computer program, the program having a critical execution period in which the program relies on a predetermined address line to be in a disabled state, the apparatus comprising:

a predetermined address line having an enabled state and a disabled state;

an address space comprising an upper address space and a lower address space, the upper address space being addressable only when a predetermined address line is in the enabled state;

an operating system component stored in the upper address space; and a stub that receives calls from the program and redirects the received calls to the operating system component after ensuring that the predetermined address line is in the enabled state, the stub placing the predetermined address line in the disabled state upon completion of the redirected call when the program is executing in the critical execution period, the stub leaving the predetermined address line in the enabled state upon completion of the redirected call when the program is not executing in the critical execution period.

9. The apparatus of claim 8 wherein the stub determines whether the program is in the critical execution period by determining whether the stub has received less than a predetermined number of calls from the program.

10. In a computer system having an upper memory region containing an operating system module and a lower memory region containing an application module, a method for allowing the application module to access the operating system module, the computer system having an indicator, the indicator having a first state and a second state, the operating system being accessible only when the indicator is in the second state, the method comprising the computer-implemented steps of:

ensuring that the indicator is in the second state before passing control from the application module to the operating system module;

counting a number of times that control is passed from the application module to the operating system module; and when returning control from the operating system module to the application module, ensuring that the indicator is in the first state when the counted number is less than a predefined value.

11. A computer-readable medium containing instructions for causing a computer to interface a program with an operating system, the computer having a lower memory region which is addressable when a predetermined address line is in a disabled state and having an upper memory region which is addressable when the predetermined address line is in an enabled state, and wherein the application program relies on the predetermined address line to be set in the disabled state during initial stages of operation of the program, by:

storing an operating system stub in the lower memory region;

storing a portion of the operating system in the upper memory region;

receiving the operating system call in the operating system stub;

redirecting the received operating system call to the operating system by ensuring that the predetermined address line is in the enabled state;

performing the operating system call by accessing the portion of the operating system in the upper memory region; and after performing the operating system call, when the program is in its initial stages of operation, setting the predetermined address line to the disabled state; and returning to the program.

12. The computer-readable medium of claim 11 wherein the redirecting of the received operating system call to the operating system is performed by the operating system stub and setting the predetermined address line to the enabled state if the predetermined address line is in the disabled state.

13. The computer-readable medium of claim 11 wherein the determining of whether the application program is in the initial stages of operation comprises determining whether the application program has made less than a predetermined number of calls to the operating system.

14. A method in a computer system for accessing a portion of an operating system stored in upper memory that is accessible when a predetermined address line is enabled, the access being on behalf of an application program that needs the predetermined address line disabled during its initial stages of operation, the method comprising:

storing an operating system stub in a lower portion of memory that is accessible when the predetermined address line is disabled;

receiving in the operating system stub an operating system call; and upon receiving the operating system call, when the predetermined address line is disabled, enabling the predetermined address line;

forwarding the operating system call to the portion of the operating system stored in upper memory; and upon returning from the portion of the operating system stored in upper memory, determining whether the application program is in its initial stages of operation; and when the application program is in its initial stages of operation, disabling the predetermined address line.

15. The method of claim 14 wherein the determining whether the application program is in its initial stages of operation includes determining whether the application program has made less than a predetermined number of operating system calls.

16. A computer-readable medium containing instructions for causing a computer system to access a portion of an operating system stored in upper memory that is accessible when a predetermined address line is enabled, the access being on behalf of an application program that needs the predetermined address line disabled during its initial stages of operation, by:

storing an operating system stub in a lower portion of memory that is accessible when the predetermined address line is disabled;

receiving in the operating system stub an operating system call; and upon receiving the operating system call, determining whether the application program is in its initial stages of operation;

when the application program is in its initial stages of operating, enabling the predetermined address line;

forwarding the operating system call to the portion of the operating system stored in upper memory; and upon returning from the portion of the operating system stored in upper memory, when the application program is in its initial stages of operation, disabling the predetermined address line.

17. The method of claim 16 wherein the determining whether the application program is in its initial stages of operation includes determining whether the application program has made less than a predetermined number of operating system calls.

* * * * *